(12) United States Patent
Thursby et al.

(10) Patent No.: US 9,810,595 B2
(45) Date of Patent: *Nov. 7, 2017

(54) PIPELINE INSPECTION APPARATUS

(71) Applicant: E.V. Offshore Limited, Norwich (GB)

(72) Inventors: Jonathan Thursby, Norwich (GB); Shaun Peck, Suffolk (GB); Chris Jay, Norwich (GB)

(73) Assignee: E.V. Offshore Limited (GB)

( * ) Notice: Subject to any disclaimer, the term of this patent is extended or adjusted under 35 U.S.C. 154(b) by 132 days.

This patent is subject to a terminal disclaimer.

(21) Appl. No.: 14/944,776

(22) Filed: Nov. 18, 2015

(65) Prior Publication Data

US 2016/0069769 A1    Mar. 10, 2016

Related U.S. Application Data

(62) Division of application No. 13/942,937, filed on Jul. 16, 2013, now Pat. No. 9,206,938.

(30) Foreign Application Priority Data

Jul. 16, 2012  (GB) .................................. 1212624.9

(51) Int. Cl.
| | |
|---|---|
| *G01M 1/00* | (2006.01) |
| *G01M 3/00* | (2006.01) |
| *F16L 55/1645* | (2006.01) |
| *G01M 3/18* | (2006.01) |
| *F16L 55/26* | (2006.01) |

(Continued)

(52) U.S. Cl.
CPC ....... *G01M 3/005* (2013.01); *F16L 55/16455* (2013.01); *F16L 55/26* (2013.01); *F16L 55/28* (2013.01); *F16L 55/38* (2013.01); *G01M 1/00* (2013.01); *G01M 3/00* (2013.01); *G01M 3/183* (2013.01); *F16L 2101/30* (2013.01)

(58) Field of Classification Search
None
See application file for complete search history.

(56) References Cited

U.S. PATENT DOCUMENTS

| | | | |
|---|---|---|---|
| 3,667,359 A | 6/1972 | Watts et al. | |
| 3,885,091 A | 5/1975 | Fish et al. | |

(Continued)

FOREIGN PATENT DOCUMENTS

| | | | | |
|---|---|---|---|---|
| CA | 2256185 A1 | * | 6/2000 | ............. H04N 7/181 |
| GB | 9025394 | * | 1/1991 | ....... E21B 47/02208 |

(Continued)

*Primary Examiner* — Andre Allen
(74) *Attorney, Agent, or Firm* — Hayes Soloway PC

(57) ABSTRACT

A pipeline inspection apparatus includes a main body. A sealing structure attached to the main body seals against an internal surface of the pipeline. An imaging module includes a camera and a light source. The light source is arranged to emit light in a direction towards the internal surface of the pipeline. The camera is arranged such that, in use, the camera captures image data of the internal surface of the pipeline. Control circuitry includes a power supply and memory for storing data captured by said camera, wherein the sealing structure forms a seal against the internal surface of the pipeline such that, in use, a fluid flowing along the pipeline applies a driving force to the pipeline inspection apparatus to propel the apparatus along the pipeline.

20 Claims, 4 Drawing Sheets

(51) Int. Cl.
*F16L 55/38* (2006.01)
*F16L 55/28* (2006.01)
*F16L 101/30* (2006.01)

(56) References Cited

U.S. PATENT DOCUMENTS

| | | | | |
|---|---|---|---|---|
| 4,363,545 A | * | 12/1982 | Schaefer | G03B 37/005 346/33 P |
| 4,372,658 A | * | 2/1983 | O'Connor | G03B 37/005 324/220 |
| 4,868,648 A | * | 9/1989 | Nobunaga | G01B 11/272 348/135 |
| 5,195,392 A | | 3/1993 | Moore et al. | |
| 5,956,135 A | | 9/1999 | Quesnel | |
| 2003/0198374 A1 | | 10/2003 | Hagene et al. | |
| 2004/0006448 A1 | | 1/2004 | Penza | |
| 2004/0027129 A1 | | 2/2004 | Cull | |
| 2007/0051192 A1 | | 3/2007 | Penza et al. | |
| 2008/0105067 A1 | * | 5/2008 | Frey | G01B 11/24 73/865.8 |
| 2009/0080980 A1 | | 3/2009 | Cohen | |
| 2010/0157043 A1 | * | 6/2010 | Demers | G01B 11/14 348/84 |
| 2012/0069172 A1 | * | 3/2012 | Hudritsch | G01N 21/954 348/84 |
| 2014/0009598 A1 | * | 1/2014 | O'Donnell | G01M 3/005 348/84 |
| 2014/0020593 A1 | | 1/2014 | Early et al. | |
| 2014/0080224 A1 | | 3/2014 | Tunheim et al. | |
| 2014/0081594 A1 | | 3/2014 | Tunheim et al. | |

FOREIGN PATENT DOCUMENTS

| | | |
|---|---|---|
| JP | 6454234 A | 4/1989 |
| JP | 2003343791 A | 12/2003 |

\* cited by examiner

PIPELINE INSPECTION APPARATUS

CROSS REFERENCE TO RELATED APPLICATIONS

This application is a divisional of co-pending U.S. application Ser. No. 13/942,937 filed on Jul. 16, 2013, which claims priority of United Kingdom Application Serial No. 1212624.9 filed on Jul. 16, 2012, each of which this application claims benefit from and the contents of which are hereby incorporated by reference.

BACKGROUND a. Field of the Invention

This invention relates to a pipeline inspection apparatus and to a method of inspecting the internal surfaces of a pipeline using a pipeline inspection apparatus.

b. Related Art

Pipeline Inspection Gauges (Pigs) are known for use in pipeline cleaning and inspection. Typically a Pig is inserted into a pipeline at a particular point (a launching station), is propelled along the pipeline by the flow of fluid through the pipeline and is then removed from the pipeline at a specific point further downstream (a receiving station).

The use of Pigs allows pipes to be cleaned and the condition of the pipes to be inspected without stopping the flow of fluid through the pipe.

An intelligent Pig, or Smart Pig, can be used to collect data, typically about the condition of the pipeline, while it is travelling along the pipeline. Some prior art devices, for example, have incorporated sensors to detect pipe defects and corrosion. Data from these sensors are then analysed once the Pig has been retrieved from the pipeline. In order to determine the position of any defect within the pipeline, Pigs often also incorporate some form of location monitoring system, or the location of the Pig is monitored by sensors located above-ground.

Pipelines often contain fluids at a high temperature, and the fluids may be highly acidic or basic. For these reasons it is necessary to carefully protect any sensors and electronics that are contained within the Pig.

It some circumstances it is desirable to capture images of the internal wall of a pipeline. Prior art systems have been developed that can travel along a length of pipeline and which incorporate a video camera. These systems mount the camera on a wheeled apparatus, or tractor, to enable the speed of passage of the camera through the pipeline to be controlled to capture images of sufficient quality for subsequent analysis.

Additionally, these systems incorporate a line or tether linking the camera tractor back to a base station. The tether permits a user to control movement of the camera tractor, permits video images to be streamed back to the base station for observation and permits the camera tractor to be retrieved from the pipeline after use.

It is an object of the present invention to provide an improved pipeline inspection apparatus that overcomes some of the problems with prior art devices.

SUMMARY OF THE INVENTION

According to the invention there is provided a pipeline inspection apparatus comprising:
a main body;
sealing means for sealing against an internal surface of the pipeline, the sealing means being attached to the main body;
an imaging module, the imaging module comprising a camera and a light source, the light source being arranged to illuminate the internal surface of the pipeline, and the camera being arranged such that, in use, the camera captures image data of the internal surface of said pipeline; and
control circuitry, the control circuitry including a power supply and memory means for storing data captured by the camera,
wherein the sealing means forms a seal against the internal surface of the pipeline such that, in use, a fluid flowing along the pipeline applies a driving force to the pipeline inspection apparatus to propel the apparatus along the pipeline.

Preferably the main body has a front end and a rear end relative to a direction of travel of the apparatus along a pipeline in use. Preferably the imaging module is mounted proximate the front end of the main body.

The control circuitry may be located within the main body.

Preferably the light source surrounds said camera to more evenly illuminate the area to be imaged.

In preferred embodiments the camera is forward-facing, relative to a direction of travel of the apparatus along a pipeline, and the light source emits light in a direction forwards and outwards, such that the camera captures image data of the internal surface of the pipeline at a distance in front of the apparatus.

Preferably the camera is located along a central longitudinal axis of the apparatus.

To aid propulsion of the inspection apparatus along the pipeline the sealing means preferably forms a fluid tight seal against the internal surface of the pipeline.

The apparatus preferably comprises first and second sealing means spaced apart along the length of the main body between the front and rear ends.

The camera is preferably a video camera. Additionally, the light source typically comprises an array of light sources spaced apart around the camera. These light sources are preferably light emitting diodes due to their low power consumption.

A face plate is preferably used to seal the main body at the front end, the face plate comprising an inner portion and an outer portion surrounding the inner portion. The inner portion preferably includes a transparent window through which, in use, images are captured by the camera, and the outer portion preferably includes a transparent window through which, in use, light is emitted by the light source. To permit the light to be emitted in a direction forwards and outwards towards the internal surface of the pipeline, the outer portion is preferably sloped relative to the longitudinal axis of the apparatus.

The outer portion is preferably sloped at an angle of between 5° and 85° to the longitudinal axis, and is more preferably sloped at an angle between 30° and 80° to the longitudinal axis.

In a preferred embodiment of the invention the outer portion is annular and is sloped such that radially inner parts of the outer portion are further forward, relative to a direction of travel of the apparatus along a pipeline in use, than radially outer parts of the outer portion.

The inner portion may comprise a side wall that projects forward from the outer portion. A lens of the camera may then be located within this side wall such that the camera is mounted further forward than the light source.

The inspection apparatus preferably comprises a capping piece seated around the inner portion. Preferably the capping piece surrounds the side wall of the inner portion.

The capping piece preferably has a sloped outer surface such that a first, furthest forward, end of the capping piece has a larger circumference than a second, rear end of the capping piece. In this way the capping piece forms a flared nose of the apparatus.

The sloped outer surface of the capping piece assists in deflecting the emitted light outwards, towards the internal walls of the pipeline and away from the centrally located camera lens. The flared capping piece additionally forms a protective member that prevents the face plate from being damaged if the front of the inspection apparatus collides with or scrapes against the internal surface of the pipeline and, similarly, protects any coating on the internal surface of the pipeline from damage caused by contact with the front of the inspection apparatus, especially as the apparatus passes around bends in the pipeline.

To further protect the front end of the inspection apparatus and the internal surfaces of the pipeline, the apparatus preferably comprises a guard member surrounding the front end of the main body, the guard member being made from a resilient material.

It is advantageous if the inspection apparatus is autonomous and does not require a link or tether back to a base station. For this reason it is preferable if the power supply comprises a battery. The battery may be rechargeable.

Additionally it is desirable if the inspection apparatus can be pre-programmed so that a permanent communication link does not need to be maintained between the apparatus and a base station in order to control the apparatus during deployment. As such, it is preferably if the control circuitry comprises means for switching the camera and lights on and off at pre-programmed time points after the apparatus is switched on.

Preferably the apparatus comprises means for measuring the speed of the apparatus through the pipeline in use. The measured speed may then be used to control a frame rate of the camera, such that the frame rate may be increased as the speed of the apparatus increases.

The apparatus may comprise means for determining the orientation of the apparatus within a pipeline.

In some embodiments of the inspection apparatus the sealing means comprises a sealing disc. Preferably the sealing means comprises two or more sealing discs spaced apart along the length of the apparatus. In order to accommodate varying diameters along the length of the pipeline through which the inspection apparatus travels it is desirable for at least one of the sealing discs to have a different diameter to the other sealing discs, such that a seal is maintained between the inspection apparatus and the internal surface of the pipeline.

In other embodiments the sealing means may comprise a cup-shaped sealing member having a sloped side wall.

Preferably the main body comprises a flange and the sealing means is clamped to the flange. This arrangement enables the sealing means to be easily changed or replaced as required.

The length of the inspection apparatus, between the front end and the rear end of the main body, is preferably between 300 mm and 400 mm, to enable the apparatus to pass around tight bends in the pipeline.

The invention also provides a method of inspecting the internal surfaces of a pipeline using an inspection apparatus according to the invention, the method comprising:
  pre-programming the control circuitry with a recording schedule;
  initiating the inspection apparatus;
  deploying the inspection apparatus within a pipeline to be inspected;
  retrieving the inspection apparatus from the pipeline; and
  downloading image data from the memory means,
  wherein, the recording schedule comprises time points, after initiation of the apparatus, at which image data captured by the camera is recorded to the memory means.

Preferably the apparatus comprises means for switching the camera on and off and the recording schedule comprises time points after initiation of the apparatus at which the camera is switched on and off.

Preferably the apparatus comprises means for switching the light source on and off and for adjusting the intensity of the light source, and the recording schedule comprises data specifying a light intensity at specific time points after initiation of the apparatus.

Switching off the camera and light source, or decreasing the intensity of the light source, during deployment of the inspection apparatus allows the power consumption to be minimised. Additionally, the intensity of the light source may be adjusted depending on the type of fluid through which the apparatus moving.

In preferred embodiments the inspection apparatus comprises means for measuring the speed of the apparatus through a pipeline, and the method comprises adjusting a frame rate of the camera based on the measured speed of the apparatus.

In some embodiments the inspection apparatus may be deployed within a relatively complex network of pipelines. In these situations it is desirable if the inspection apparatus comprises means to log its position within the pipeline. The inspection method then preferably comprises the steps of logging the position of the inspection apparatus during deployment, creating a graphical representation of the geometry of the pipeline, and linking the graphical representation to the image data. This enables the exact location of any regions of interest identified by the image data to be determined

BRIEF DESCRIPTION OF THE DRAWINGS

The invention will now be further described by way of example only and with reference to the following drawings, in which.

DETAILED DESCRIPTION

Figure 1:
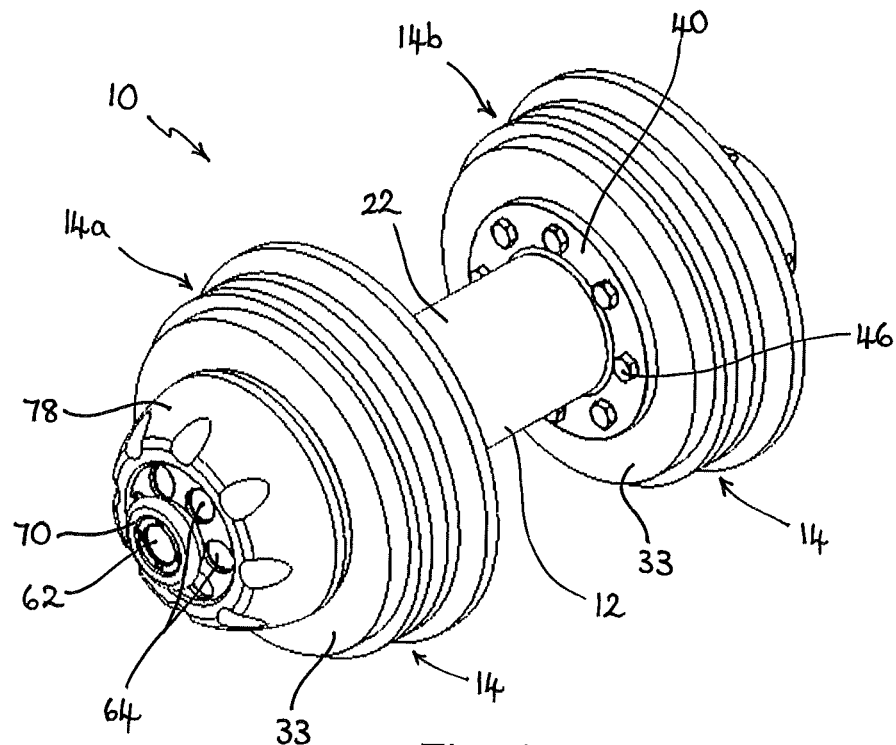
FIG. 1 is a perspective view from the front of a pipeline inspection apparatus according to a first preferred embodiment of the present invention.
Figure 2:
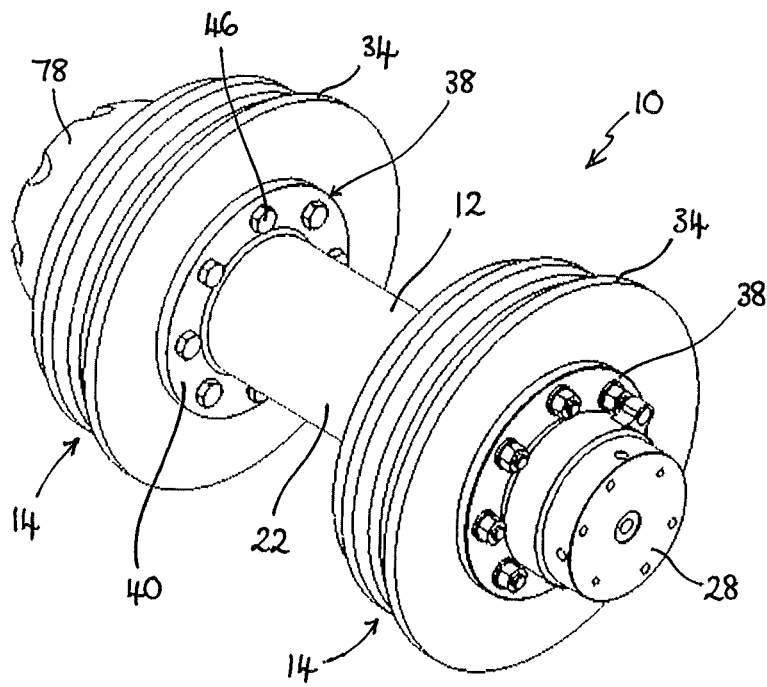
FIG. 2 is a perspective view from the rear of the pipeline inspection apparatus of FIG. 1.

FIGS. 1 to 4 show a pipeline inspection apparatus 10 according to a first preferred embodiment of the present invention. The pipeline inspection apparatus 10 comprises a substantially cylindrical main body 12, sealing means 14 and an imaging module comprising a camera and light sources (not shown in FIGS. 1 to 4).

The sealing means 14 are arranged to form a fluid tight seal against an internal surface of a pipeline (not shown) along which the apparatus 10 travels in use. In this way, a fluid, flowing along the pipeline, pushes against a rear surface of the sealing means 14 and main body 12 to force or propel the apparatus 10 along the pipeline. This has the advantage that the inspection apparatus 10 does not require its own drive means to provide motion through the pipeline, thereby reducing the complexity and the power requirements of the apparatus 10.

The main body 12 comprises a tubular housing 22 having a front end 24 and a rear end 26 relative to the direction of travel of the apparatus 10 through a pipeline in use. The main body 12 is preferably made from stainless steel, but may be made from any suitable material able to withstand the high pressures and temperatures encountered in a pipeline.

The rear end 26 of the housing 22 is sealed by a cover 28 having a circular end plate 30 and a tubular side wall 32 extending perpendicularly from the perimeter of the end plate 30. The internal diameter of the cover side wall 32 is substantially equal to the external diameter of the housing 22 such that the rear end 26 of the housing 22 is received within the side wall 32 of the cover 28. Suitable sealing means such as O-rings may be used to provide a fluid-tight seal between the cover 28 and the housing 22.

The cover 28 is, preferably, removable from the rear end 26 of the housing 22 to permit access to an internal space 23 of the housing 22, as further described below.

The sealing means 14 comprises a first sealing means 14a and a second sealing means 14b spaced apart along the length of the main body 12. In particular, the first sealing means 14a is located proximate the front end 24 of the housing 22 and the second sealing means 14b is located proximate the rear end 26 of the housing 22. In this embodiment each of the sealing means 14a, 14b are identical and will be referred to generally in the following description as the sealing means 14.

The sealing means 14 comprises a guiding or alignment disc 33 and a plurality of sealing discs 34; each disc 33, 34 extending radially outwards around the complete circumference of the housing 22. The alignment disc 33 and the sealing discs 34 are preferably made from a resilient material, for example a rubber or plastics material, such as polyurethane. The diameter of the alignment disc 33 is slightly less than the diameter of the smallest sealing disc 34 and the thickness of the alignment disc 33 is greater than the thickness of the sealing discs 34. The function of the alignment disc 33 is to maintain the alignment of the inspection apparatus 10 within a pipeline such that a longitudinal axis 35 of the inspection apparatus 10 remains substantially parallel to a longitudinal axis of the pipeline in the region of the apparatus 10.

In this embodiment the sealing means 14 comprises three sealing discs 34 held apart from each other along the length of the housing 22 by two spacer discs 36 located between the sealing discs 34. Preferably the thickness of the spacer discs 36 is one to two times the thickness of the sealing discs 34. In other embodiments any suitable number of sealing discs 34 may be included, together with a corresponding number of spacer discs 36.

In the specific arrangement shown, first and second sealing discs 34a, 34b nearest the front end 24 of the housing 22 are of a first diameter. The third sealing disc 34c in each group of three, furthest from the front end 24, is of a second, larger diameter than the first and second discs 34a, 34b. The differences in the diameters of the sealing discs 34 allows changes in the internal dimensions of the pipeline to be accommodated, while still maintaining an adequate fluid-tight seal between the sealing discs 34 and internal surfaces of the pipeline to enable propulsion of the inspection apparatus 10 along the pipeline.

Preferably the sealing discs 34 are interchangeable such that discs 34 having different diameters may be secured to the main body 12 depending on the internal diameter of the pipeline through which the inspection apparatus 10 will travel. In particular, the diameters of the sealing discs 34 are chosen to provide a close fit between the outer edge of the sealing disc 34 and an internal surface of a pipeline, such that a fluid tight seal is formed between the inspection apparatus 10 and the pipeline.

The sealing means 14 are secured to the housing 22 by mechanical fastening means 38. In this embodiment the housing 22 includes two flanges 40 that are integrally formed with the housing 22 and extend radially from an external surface 42 of the housing 22; a first of the two flanges 40a being nearer the front end 24 of the housing 22 and a second of the two flanges 40b being nearer the rear end 26 of the housing 22. In a preferred embodiment the first flange 40a is located about one third of way along the length of the housing 22 from the front end 24 and the second flange 40b is located about two thirds of the way along the length of the housing 22.

Each flange 40 includes a plurality of holes 44 spaced equally apart around the flange 40, and through which a plurality of bolts 46 extend. The bolts 46 pass through corresponding holes 48 in each of the sealing discs 34 and spacer discs 36 to secure the sealing means 14 to the housing 22. A ring-shaped clamping plate 49 is positioned on the opposite side of the sealing means 14 from the flange 40 such that the sealing discs 34 and spacer discs 36 are clamped between a respective flange 40 and clamping disc 49 by means of the bolts 46.

Securing the sealing discs 34 to the main body 12 in this way allows the sealing discs 34 to be changed easily to attach sealing discs 34 of a different diameter or to replace worn discs 34, or for more or fewer discs 34 to be secured to the housing 22 depending on the type of pipeline being inspected.

Figure 3:
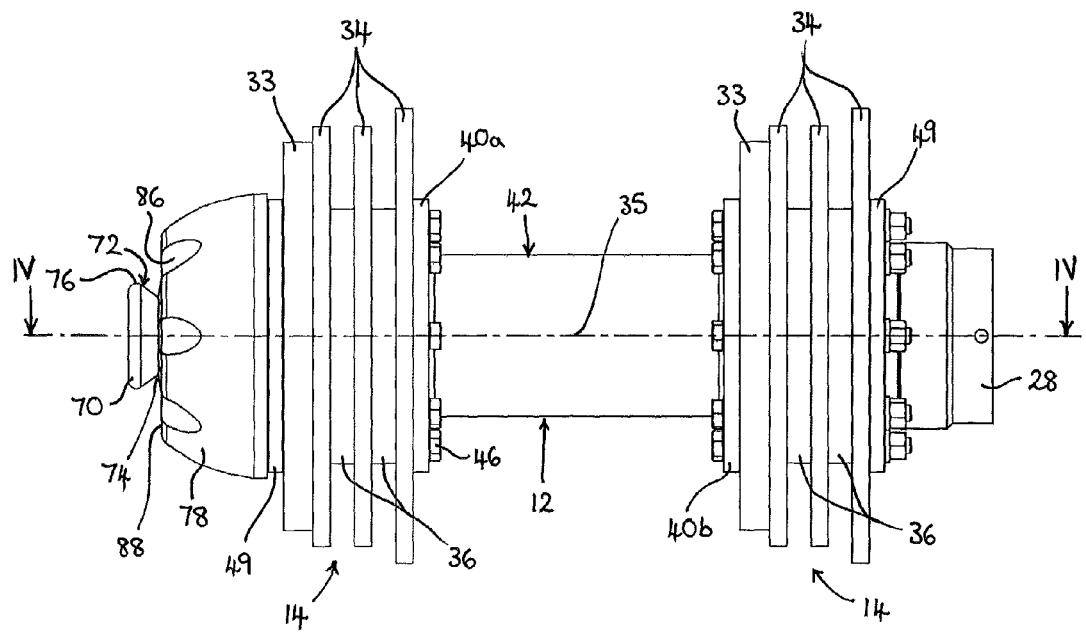
FIG. 3 is a plan view from the side of the pipeline inspection apparatus of FIG. 1.
Figure 4:
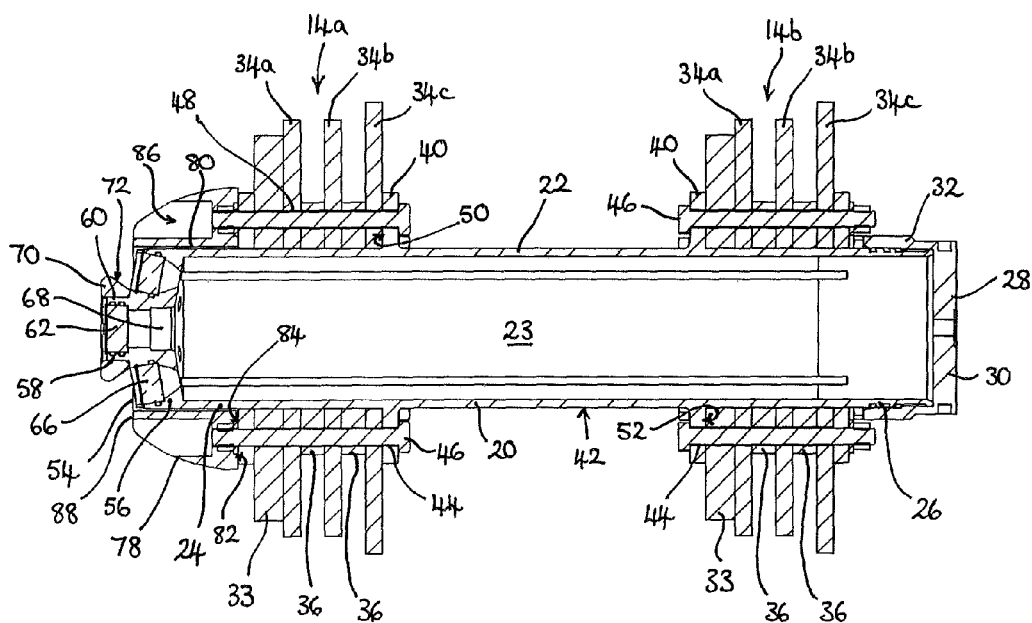
FIG. 4 is a cross-sectional view of the pipeline inspection apparatus of FIG. 3 along the line IV-IV.
Figure 5:
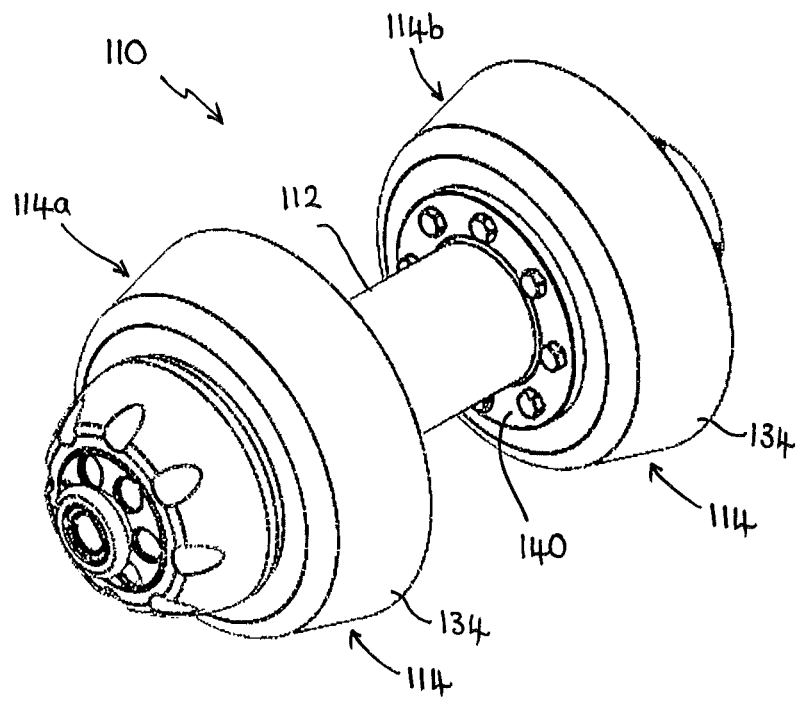
FIG. 5 is a perspective view from the front of a pipeline inspection apparatus according to a second preferred embodiment of the present invention.
Figure 6:
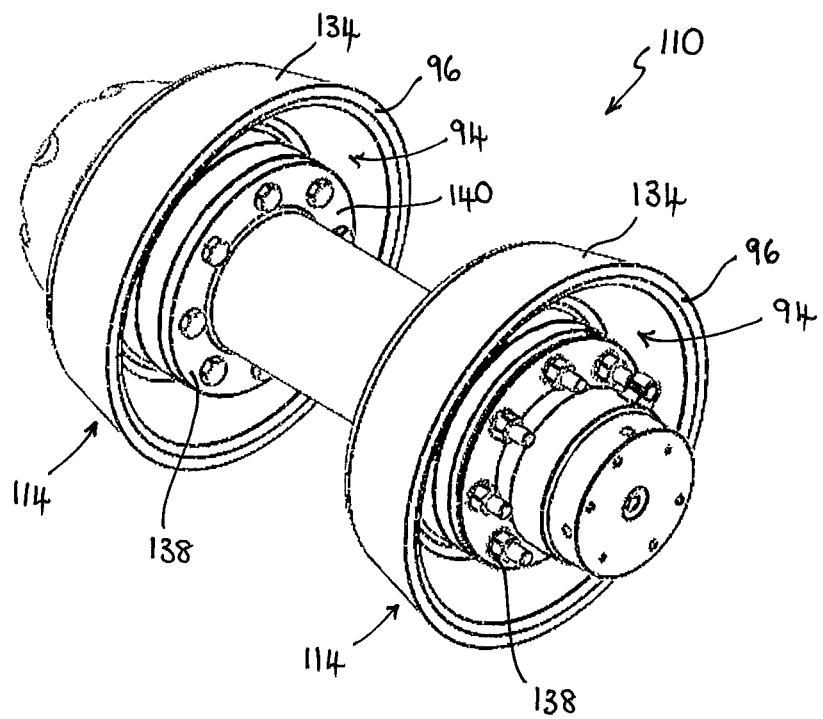
FIG. 6 is a perspective view from the rear of the pipeline inspection apparatus of FIG. 5.
Figure 7:
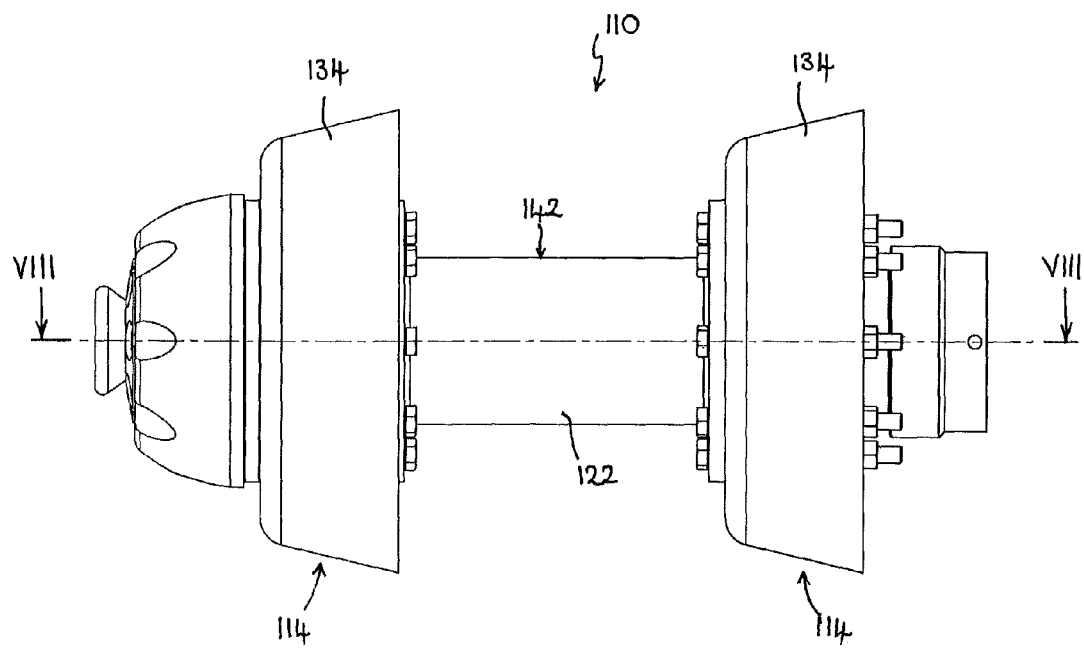
FIG. 7 is a plan view from the side of the pipeline inspection apparatus of FIG. 5.

As shown most clearly in FIGS. 3 and 4, the first sealing means 14a are secured to a front face 50 of the first flange 40a and the second sealing means 14b are secured to a rear face 52 of the second flange 40b, such that an elongate central section of the housing 22 without sealing means extends between the first and second flanges 40a, 40b.

The front end 24 of the housing 22 is sealed by a face plate 54 having a sloped outer portion 56 and a projecting inner portion 58. In this example and as shown in FIG. 4, the face plate 54 comprises a ring-shaped outer portion 56 that is integral with the tubular side wall 20 of the housing 22 at the outer edge of the outer portion 56. The outer portion 56 is sloped relative to the longitudinal axis 35 such that radially inner parts of the outer portion 56 are located further forward than radially outer parts, with respect to the direction of travel of the inspection apparatus 10 in use. A circular inner portion 58 is located in the centre of the ring-shaped outer portion 56 and comprises a tubular side wall 60 that is integrally formed with an inner edge of the outer portion 56. The tubular side wall 60 extends forward of the outer portion 56 substantially parallel to the longitudinal axis 35 of the inspection apparatus 10.

The inner portion 58 of the face plate 54 is sealed by means of an optically transparent window 62, which is received within the tubular side wall 60. Typically the window 62 is made from sapphire or another suitable material that is optically transparent and able to withstand the high pressures and temperatures that may be encountered within a pipeline. The window 62, in this example, is substantially disc-shaped and is co-axial with the main body 12 of the inspection apparatus 10.

A plurality of apertures 64 are formed spaced apart around the outer portion 56 of the face plate 54. Each of these apertures 64 is also sealed by means of an optically transparent window 66, preferably made of sapphire or a similar material. Due to the slope of the outer portion 56 of the face plate 54, an axis of each of the windows 66 in this portion 56 is at an angle to the longitudinal axis 35 of the apparatus 10.

An imaging module is located within a front portion of the internal space 23 of the housing 22 behind the face plate 54. The imaging module comprises a camera and an array of light sources. The camera is located centrally with respect to the longitudinal axis 35 of the apparatus 10 such that the camera lens 68 is aligned with the transparent window 62 in the inner portion 58 of the face plate 54. In particular the camera is arranged such that the camera lens 68 locates within the side wall 60 of the inner portion 58, directly behind the transparent window 62. The camera's image sensor (not shown) is then located behind the lens 68 within the tubular housing 22.

The camera is preferably a video camera that is able to capture high definition colour images at a high frame rate. In a preferred embodiment the camera has a resolution of 1280×720 pixels and a frame rate of 30 frames per second.

The array of light sources, which in preferred embodiments are light emitting diodes (LEDs), are arranged around the camera. In this embodiment a plurality of LEDs are arranged in a ring surrounding the camera, each of the LEDs being aligned with one of the transparent windows 66 in the outer portion 56 of the face plate 54. In this way, in use, the LEDs emit light through the transparent windows 66 to illuminate the internal surfaces of the pipeline in front of the inspection apparatus 10.

The light sources and the corresponding transparent windows 66 are preferably formed as close to the outer edge of the face plate 54 as possible to maximise the amount of light illuminating the internal surfaces of the pipeline. Furthermore, the slope of the outer portion 56 of the face plate 54 is such that the light is emitted generally in a direction outwards towards the internal surfaces of the pipeline. This minimises the amount of light that is reflected from materials flowing through the pipeline directly in front of the camera, thereby improving image quality.

The inspection apparatus 10 further comprises a capping piece 70 that is seated around the inner portion 58 of the face plate 54.

The capping piece 70 is ring-shaped and has an internal diameter substantially equal to the external diameter of the tubular side wall 60 of the inner portion 58. In preferred embodiments the capping piece 70 is screwed onto the side wall 60, so that the capping piece 70 is interchangeable and replaceable. The capping piece 70 is preferably made from a plastics material or aluminium.

An outer surface 72 of the capping piece 70 is sloped so that an outer diameter of the capping piece 70 at a first end 74 is smaller than the outer diameter of the capping piece 70 at a second end 76. The capping piece 70 is secured to the inner portion 58 of the face plate 54 such that the first end 74 of the capping piece 70 is in contact with the outer portion 56 of the face plate 54 and the second end 76 of the capping piece 70 forms a furthest forward face of the inspection apparatus 10, with respect to a direction of travel in use. In this way, the capping piece 70 forms a flared nose 70 of the inspection apparatus 10.

The capping piece 70 performs two primary functions in use. Firstly, the sloped outer surface 72 deflects light emitted through the transparent windows 66 in the outer portion 56 of the face plate 54 outwards, towards the internal walls of the pipeline and away from the camera lens 68. Secondly, the flared capping piece 70 forms a protective member or bumper around the projecting inner portion 58 of the face plate 54. In use, as the inspection apparatus 10 travels around bends in the pipeline, the capping piece 70 prevents the face plate 54 and the transparent windows 62, 66 from being damaged if the front of the inspection apparatus 10 collides with or scrapes against the internal surface of the pipeline. Additionally, the capping piece also protects any coating on the internal surface of the pipeline from damage caused by the front of the inspection apparatus 10, especially as the apparatus 10 passes around bends in the pipeline.

For additional protection at the front of the inspection apparatus 10, a protective guard member or cuff 78 is located around the front end 24 of the housing 22. The guard member 78 is in the shape of a truncated dome having a central bore 80 within which the front end 24 of the housing 22 is received. In this way, the guard member 78 is ring-shaped having a cylindrical inner surface and a convex curved outer surface. The guard member 78 is secured to the housing 22 such that the base 82 of the truncated dome, which forms the rear face 82 of the guard member 78, is seated against a front face 84 of the first sealing means 14*a* and is, in particular, in contact with the clamping plate 49. A plurality of holes 86 are formed through the guard member 78, aligned with each of the bolts 46 of the first sealing means 14*a* thereby providing access to one end of these bolts 46. The front end or face 88 of the guard member 78 is substantially aligned with a front edge of the housing 22.

The guard member 78 is preferably made from a resilient material, for example a rubber or plastics material, such as polyurethane.

A power supply (not shown in FIGS. 1 to 4) for the camera and light sources is housed within the main body 12 of the inspection apparatus 10. In a preferred embodiment the power source comprises one or more batteries.

The main body 12 also houses programmable control circuitry (not shown in FIGS. 1 to 4) for the camera and light sources, together with memory means. The memory means is used to store image data captured by the camera, which is retained on board the inspection apparatus 10. In preferred embodiments the apparatus 10 does not transmit the collected image data to a base station or similar during deployment of the apparatus 10, as this transmission requires additional power resources.

The on-board power supply and programmable control circuitry, together with the means to store image data on the memory means within the apparatus 10, means that the inspection apparatus 10 is effectively autonomous and does not need to be tethered.

Before deployment of the inspection apparatus 10 through a pipeline, the control circuitry is pre-programmed with an image recording schedule. The recording schedule comprises a series of time points, from when the inspection apparatus 10 is initiated, at which, for example, the camera will switch on and off, the light sources will switch on and off, and the memory means will start and stop recording and storing the collected image data. The recording schedule may also include time points at which the brightness of the light sources is increased or decreased and, in these embodiments, the control circuitry also includes means for adjusting the brightness of the light sources.

The removable cover 28 at the rear end 26 of the housing 22 provides access to the power supply, control circuitry and the memory means. This permits connections to be made to recharge the power supply, program the control circuitry and download data from the memory means. In a preferred embodiment it is desirable if a connection may be made directly between the control circuitry and memory means and a computer, for example by means of a USB connection.

In use, before deployment, the inspection apparatus 10 is pre-programmed with a recording schedule. For example, the schedule may comprise the following information:

TABLE 1

| Time from initiation (minutes) | Camera State | Light Level |
|---|---|---|
| 2 | ON | 100% |
| 20 | OFF | 0% |
| 60 | ON | 50% |
| 70 | OFF | 0% |
| 120 | ON | 35% |
| 150 | OFF | 0% |

The inspection apparatus 10 is then switched on or initiated just before it is deployed within the pipeline to be inspected. The inspection apparatus 10 then travels along the pipeline due to a flow of fluid through the pipeline.

While the inspection apparatus 10 is travelling through the pipeline the control circuitry operates the camera, light sources and memory means according to the recording schedule. Because the speed of movement of the inspection apparatus 10 through the pipeline is determined solely by the speed of flow of the fluid through the pipeline, the time at which the inspection apparatus 10 is passing certain points in the pipeline can be easily determined before the inspection apparatus 10 is deployed. As such, the recording schedule based simply on a time-since-initiation may be used to activate the camera and light sources only when the inspection apparatus 10 is passing known points of interest. In this way it is not necessary to keep the camera and lights switched on for the whole time that the inspection apparatus 10 is deployed, which reduces power consumption. Additionally, it is not necessary to constantly monitor the location of the inspection apparatus 10 and manually activate the camera and light sources when the inspection apparatus 10 passes points of interest, by means of transmissions to and from the apparatus 10.

The inspection apparatus 10 may, however, include a tracking system that enables the apparatus 10 to be located in the pipeline. This tracking system may emit tracker signals intermittently. In other embodiments the inspection apparatus 10 may be tracked by sensors positioned above-ground that detect the position of the apparatus 10 within the pipeline.

In preferred embodiments of the apparatus 10 the control circuitry includes a sensor for monitoring the speed at which the apparatus 10 is travelling through the pipeline and means for adjusting the camera frame rate based on the measured speed. In this way the frame rate of the camera may be increased when the apparatus 10 is travelling at higher speeds to reduce blurring of the captured images.

At the end of the deployment, the inspection apparatus 10 is retrieved from the pipeline. Image and other data, for example positional data, is then downloaded from the memory means of the apparatus 10 to a suitable computer. The video or still images captured by the camera can then be analysed to identify areas of concern or points of interest within the pipeline. If positional data is also recorded by the inspection apparatus 10, for example by an on-board odometer, this can be used to determine the exact location of these areas of concern or points of interest. Alternatively, the location of these areas may be determined based on the time after deployment at which the image was captured.

In some embodiments it is also desirable if the inspection apparatus 10 comprises means to detect its orientation within a pipeline. This orientation data is then, preferably, linked to the recorded image data such that, during analysis of the image data, the exact position of an area of interest may be determined within a pipeline. For example, the location of an area of corrosion may be determined not only in terms of its location along the length of the pipeline, but also whether the area of corrosion is at the top or bottom of the pipeline or a side of the pipeline. This information allows any remedial action that is subsequently taken to be more precisely tailored to minimise expense and disruption to the pipeline operations.

The inspection apparatus 10 may also include electronic accelerometers and gyroscopes to log the position of the inspection apparatus 10 during deployment. Data collected by the accelerometers and gyroscopes can then be used to create a graphical representation of the geometry of the pipeline. This representation may then be linked to the video images of the internal surface of the pipeline.

FIGS. 5 to 8 show a pipeline inspection apparatus 110 according to a second preferred embodiment of the present invention. The pipeline inspection apparatus 110 is substantially the same as the inspection apparatus 10 of the first embodiment and corresponding features have been indicated by reference numerals incremented by 100.

All of the components of the inspection apparatus 110 are identical to those of the first embodiment, except for the sealing means 114.

In this embodiment, the sealing means 114 comprises a first sealing means 114a and a second sealing means 114b spaced apart along the length of the main body 112, as in the previous embodiment. In this example, however, each sealing means 114 comprises a single cup-shaped sealing member 134.

The sealing member 134 comprises a substantially flat ring-shaped base portion 90 and a sloped side wall 92 extending from and integral with an outer edge of the base portion 90. The side wall 92 extends completely around the base portion 90 so as to define a central recess 94 in the sealing member 134. The side wall 92 is sloped such that an outer diameter of the sealing member 134 is smallest at the base portion 90 and increases towards a free edge 96 of the side wall 92 furthest from the base portion 90. Furthermore, the thickness of the side wall 92 decreases from a base of the side wall 92 proximate the base portion 90 towards the free edge 96 of the side wall 92.

The sealing member 134 is preferably made from a resilient and flexible material, for example a rubber or plastics material, such as polyurethane.

The sealing means 114 are secured to the housing 122 by mechanical fastening means 138. As in the first embodiment, the housing 122 includes two flanges 140 that extend radially from an external surface 142 of the housing 122; a first of the two flanges 140a being nearer a front end 124 of the housing 122 and a second of the two flanges 140b being nearer a rear end 126 of the housing 122.

Each flange 140 includes a plurality of holes 144 spaced equally apart around the flange 140, and through which a plurality of bolts 146 extend. The bolts 146 pass through corresponding holes 148 in each of the base portions 90 of the sealing members 134, to secure the sealing members 134 to the housing 122.

The orientation of the sealing members 134 when secured to the housing 122 is such that the base portions 90 are substantially perpendicular to the longitudinal axis 135 of the housing 122, and the side walls 92 extend outwards and rearwards with respect to the housing 122 and the direction of travel of the inspection apparatus 110 in use.

The size and shape of the sealing members 134 is designed such that the free edge 96 of the side walls 92 makes contact with the internal surfaces of the pipeline during deployment of the inspection apparatus 10 to provide a fluid-tight seal. The shape of the side walls 92 and the material from which they are made enables the side walls 92 to flex to accommodate irregularities and changes in diameter of the pipeline.

The sealing means 114 further comprise ring-shaped spacer discs 136. In the first sealing means 114a, the spacer discs 136 are located between the flange 140a and the base portion 90 of the first sealing member 134a, within the recess 94. The spacer discs 136 and sealing member 134a are secured to the flange 140a in front of the flange 140a, such that the spacer discs 136 are in contact with a front face 150 of the flange 140a. The bolts 146 pass through the flange 140a, the spacer discs 136, the sealing member 134a and a clamping plate 149, which is in contact with a face 98 of the base portion 90 of the sealing member 134a, to clamp the sealing means 114a to the flange 140a. In this embodiment, the thickness of the spacer discs 136 is such that the flange 140a lies substantially in the same plane as the free edge 96 of the side wall 92 of the sealing member 134a.

In the second sealing means 114b, the spacer discs 136 are also located in contact with the base portion 90 of the sealing member 134b within the recess 94. The spacer discs 136 and sealing member 134b are secured to the flange 140b behind the flange 140b, relative to a direction of travel of the inspection apparatus 110 in use, such that a face 98 of the base portion 90 of the sealing member 134b is in contact with a rear face 152 of the flange 140b. The bolts 146 pass through the flange 140b, the sealing member 134b, the spacer discs 136 and a clamping plate 149, which is in contact with the spacer discs 136, to clamp the sealing means 114b to the flange 140b.

In this way, the sealing members 134 of this embodiment are secured to the housing 122 in substantially the same way as the sealing discs 34 are secured to the housing 22 in the first embodiment. In particular, the use of spacer discs 36, 136 means that the cup-shaped sealing members 134 are completely interchangeable with the sealing discs 34, and either may be chosen depending on the circumstances in which the inspection apparatus 10, 110 is being deployed.

Figure 8:
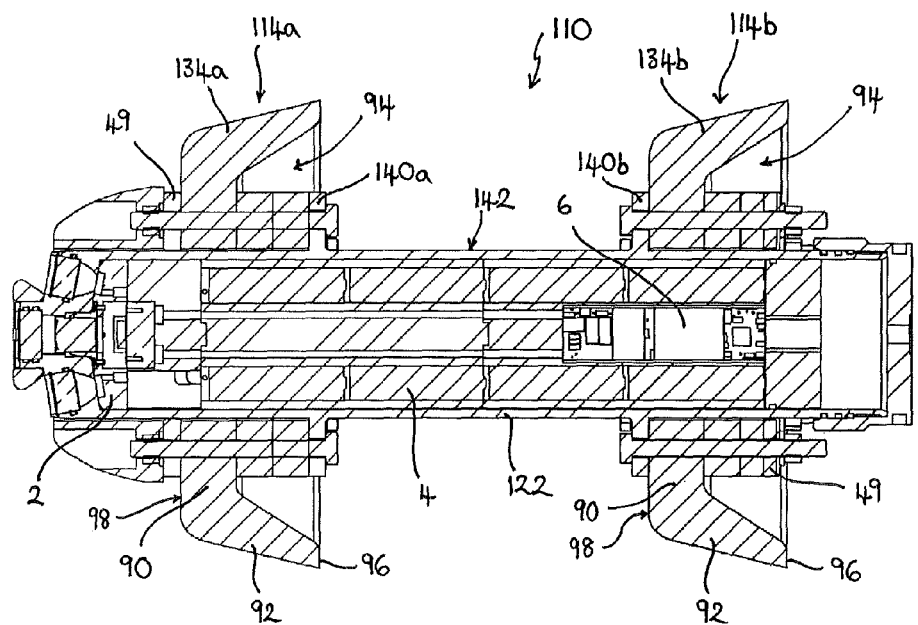
FIG. 8 is a cross-sectional view of the pipeline inspection apparatus of FIG. 7 along the line VIII-VIII.

FIG. 8 shows the location of the imaging module 2, power supply 4 and control circuitry 6 within the housing 122. As can be seen, the imaging module 2 is located at the front of the housing 122 behind the face plate 154, the power supply 4 is in the form of a plurality of batteries 4 that are positioned along the length of the housing 122, and the control circuitry 6 is located towards the rear of the housing 122.

In some embodiments of the present invention, the inspection apparatus 10, 110 includes one or more side view cameras for capturing additional high resolution images of the internal surfaces of the pipeline. In embodiments in which two or more side view cameras are included, the images captured by these cameras may be 'stitched' together during subsequent post-processing and analysis of the images to create a complete 360° view of the surface of the pipeline. These images may be used for corrosion analysis for example.

The length of the inspection apparatus 10, 110 is preferably between 300 mm and 400 mm, and more preferably between 300 mm and 350 mm. The relatively short length of the inspection apparatus 10, 110 compared to known inspection devices enables the apparatus to negotiate tight bends in the pipeline. In particular the inspection apparatus 10, 110 is designed to be able to pass around 1.5D bends (1.5D means that the centreline radius of the bend is 1.5 times the nominal pipe diameter). In a particular embodiment of the invention, the inspection apparatus 10, 110 is designed to pass through 1.5D bends in a 6" (15 cm) diameter pipe.

The inspection apparatus of the present invention, therefore, provides an improved pipeline inspection apparatus that overcomes some of the problems with prior art devices.

The invention claimed is:
1. A pipeline inspection apparatus comprising:
a main body;
sealing means for sealing against an internal surface of said pipeline, the sealing means being attached to the main body;
an imaging module, the imaging module comprising a camera and a light source, the light source being arranged to illuminate said internal surface of said pipeline, and the camera being arranged such that, in use, the camera captures image data of said internal surface of said pipeline; and
control circuitry, the control circuitry including a power supply and memory means for storing data captured by said camera,
wherein the sealing means forms a seal against said internal surface of the pipeline such that, in use, a fluid flowing along said pipeline applies a driving force to the pipeline inspection apparatus to propel the apparatus along said pipeline.

2. A pipeline inspection apparatus as claimed in claim 1, wherein the camera is forward-facing and the light source emits light in a direction forwards and outwards, such that the camera captures image data of said internal surface of said pipeline at a distance in front of the apparatus.

3. A pipeline inspection apparatus as claimed in claim 1, wherein the sealing means forms a fluid tight seal against said internal surface of the pipeline.

4. A pipeline inspection apparatus as claimed in claim 1, wherein the apparatus comprises first and second sealing means spaced apart along the length of the main body between the front and rear ends.

5. A pipeline inspection apparatus as claimed in claim 1, wherein the light source comprises an array of light sources spaced apart around the camera.

6. A pipeline inspection apparatus as claimed in claim 1, wherein the main body comprises a face plate at the front end, the face plate comprising:
    an inner portion, the inner portion including a transparent window through which, in use, images are captured by the camera; and
    an outer portion, the outer portion surrounding the inner portion and having a transparent window through which, in use, light is emitted by the light source,
    wherein, the outer portion is sloped relative to the longitudinal axis of the apparatus.

7. A pipeline inspection apparatus as claimed in claim 6, wherein the outer portion is annular and the outer portion is sloped such that radially inner parts of the outer portion are further forward, relative to a direction of travel of the apparatus along a pipeline in use, than radially outer parts of the outer portion.

8. A pipeline inspection apparatus as claimed in claim 7, wherein the apparatus comprises a capping piece seated around the inner portion, the capping piece having a sloped outer surface such that a first, furthest forward, end of the capping piece has a larger circumference than a second, rear end of the capping piece.

9. A pipeline inspection apparatus as claimed in claim 1, wherein the apparatus comprises a guard member surrounding the front end of the main body, the guard member being made from a resilient material.

10. A pipeline inspection apparatus as claimed in claim 1, wherein the control circuitry comprises a switch for switching the camera and lights on and off at pre-programmed time points after the apparatus is switched on.

11. A pipeline inspection apparatus as claimed in claim 1, wherein the apparatus comprises a speed sensor for measuring the speed of the apparatus through the pipeline in use.

12. A pipeline inspection apparatus as claimed in claim 1, wherein the apparatus comprises an orientation sensor for determining the orientation of the apparatus within a pipeline.

13. A pipeline inspection apparatus as claimed in claim 1, wherein the sealing means comprises two or more sealing discs spaced apart along the length of the apparatus.

14. A pipeline inspection apparatus as claimed in claim 13, wherein at least one of the sealing discs has a different diameter to the other sealing discs.

15. A pipeline inspection apparatus as claimed in claim 1, wherein the sealing means comprises a cup-shaped sealing member having a sloped side wall.

16. A method of inspecting the internal surfaces of a pipeline using an inspection apparatus as claimed in claim 1, the method comprising:
    pre-programming said control circuitry with a recording schedule;
    initiating the inspection apparatus;
    deploying the inspection apparatus within a pipeline to be inspected;
    retrieving the inspection apparatus from the pipeline; and
    downloading image data from said memory means,
    wherein, the recording schedule comprises time points after initiation of the apparatus at which image data captured by the camera is recorded to the memory means.

17. A method as claimed in claim 16, wherein the apparatus comprises means for switching the camera on and off and the recording schedule comprises time points after initiation of the apparatus at which the camera is switched on and off.

18. A method as claimed in claim 16, wherein the apparatus comprises a switch for switching the light source on and off and for adjusting the intensity of the light source, and the recording schedule comprises data specifying a light intensity at specific time points after initiation of the apparatus.

19. A method as claimed in claim 16, wherein the apparatus comprises a speed sensor for measuring the speed of the apparatus through a pipeline, and the method comprises adjusting a frame rate of the camera based on the measured speed of the apparatus.

20. A method as claimed in claim 16, wherein the method comprises:
    logging the position of the inspection apparatus during deployment;
    creating a graphical representation of the geometry of the pipeline; and
    linking the graphical representation to said image data.

* * * * *